July 6, 1926.
W. BEANEY
1,591,605
TIRE FLAP
Filed June 28, 1924
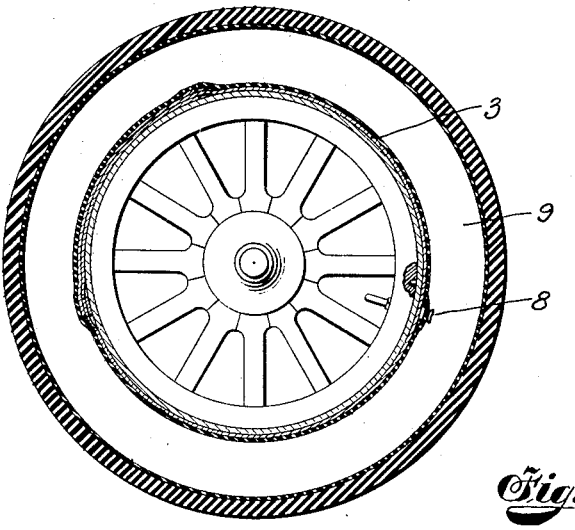
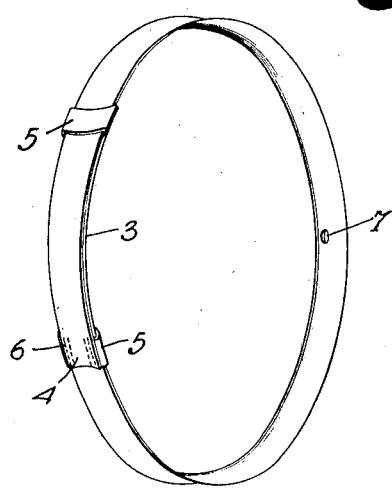
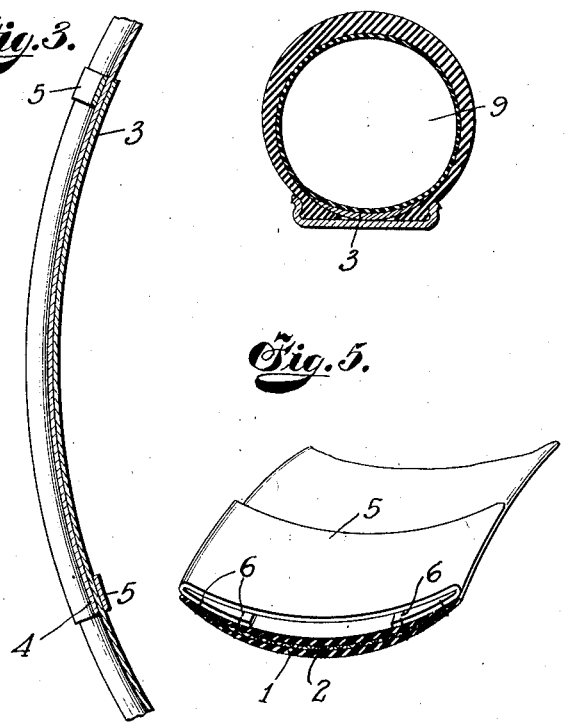
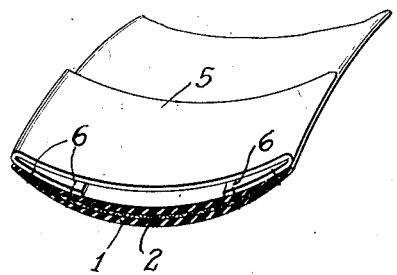
William Beaney, INVENTOR
BY Ramsay Hoguet, ATTORNEY Patented July 6, 1926.

1,591,605

UNITED STATES PATENT OFFICE.

WILLIAM BEANEY, OF NEW YORK, N. Y.

TIRE FLAP.

Application filed June 28, 1924. Serial No. 723,051.

This invention relates to vehicle tire, and more particularly to a lining or flap to be placed between the inner tube and rim for the protection of the former.

Flaps for a long time have been used between the rims and inner tubes of tires in an endeavor to protect the tubes from destruction, either by the chafing action of the beads of the tire casing, or by being pinched between the casing and the rim, or by direct contact with the rim which, during use, rusts and presents an abrasive inner surface. At least two types of these flaps are used, one being a non-continuous flap with overlapping ends, and the other being a continuous flap. Each, however, possesses such inherent defects as to render it almost ineffective to prevent the destruction of the tubes and, in fact, in some cases enhances the destruction of the tubes. In neither type will the flaps properly adjust themselves during the mounting, inflation or demounting of the tire, on either a clincher or split rim. This lack of proper adjustment really defeats the intended function of the flap. For instance, in the non-continuous type of flap which is commonly used and which has a circular opening in one end and an elongated opening in the other end for the accommodation of the valve stem, there is no possibility of proper automatic adjustment during the mounting, inflation or demounting of the tire to permit the flap to properly conform to the contour and to assume correct position in the tire, and form, in fact, a continuation of the wall of the casing between the edges of the heads. In this particular type of flap the valve stem is inserted through the circular and elongated openings. This, of course, is done after the tube has been placed within the casing and before the casing is placed on the rim. At this time, that is to say before the placing of the casing over the rim, the effective diameter of the flap is, of course, greater than that which it will ultimately be, since it lies entirely within the casing and its central portion does not protrude between the edges of the beads as it is intended to do after inflation upon a rim. Should this tire, so assembled with the tube and flap, be forced upon a clincher type of rim, the tire would, of course, stretch to a diameter equal to that of the outside of the flanges of the rim, and during this stretching of the tire the flap, quite naturally, would expand to a greater extent. When, however, after the tire is put in place on the rim, whether it be of the clincher or split type, the tube is inflated, there will be no substantial contraction of the flap because the attachment of the ends of the flap to the valve stem and the pressure of the base of the valve stem against the rim will hold the ends against sliding movement, one upon the other. The result is that while the flap may be forced against the rim and against the tire casing by the pressure within the tube, it is not so forced in a concentric form, but the edges extend to different degrees in overlapping relation with the tire casing, (which overlapping relation is sometimes reduced to such an extent that there is no overlapping at all), nor does the flap lie flat against the rim. This is because of the fact that there is no substantial contraction of the flap and therefore, in the forcing of the flap against the rim, the pressure of the tire develops, in the flap, wrinkles which are, of course, detrimental to the tube. Furthermore, the flap is not perfectly set in place within the casing and against the rim by the inflation due to this lack of alignment with the edges of the casing and to the development of wrinkles in the flap. This results in the flap being in effect, a floating element within the casing, which varies its position with the variation in the pressure in the tube.

With the continuous flaps there is, of course, no adjustment and this is quite naturally a distinct disadvantage, since after the flap is once used and changes its diameter it will no longer be useful for the purpose of preventing the wearing of the tube. It is quite obvious, for instance, that a continuous flap cannot successfully be used in connection with a clincher rim, for if the flap is once stretched in order to permit the mounting on a clincher rim, it can never resume its original diameter and without such resumption it will be inoperative to accomplish the intended function, that is to say, the protection of the tube. This type of flap cannot contract as it should during inflation.

Furthermore, the use of the non-continuous type of flap, which is anchored to the valve stem, increases the weight of the tire on the valve stem side to quite a material extent. It is to be remembered that on a rim-mounted tire there is considerable weight on one side. For instance, the tube carries the valve stem, the valve spreader, and the valve base, which latter is vulcanized to the tube and is quite substantial in size. Furthermore, on this side of the rim the rim lock, that is to say, the lug which locks the rim to the wheel, is located. It will therefore be seen that when the overlapping ends of the flap are attached to the valve stem these overlapping ends add to the weight which tends to destroy the balance of the tire rather than acting as a counterbalance therefor. This destruction of the balance of the tire is particularly detrimental to the present-day balanced tire, due to the low pressure within the latter and to the inertia of the overlapping ends and the valve stem during the use of the tire.

In the butt end type of flap the end is always too long for perfect fit and is subject to longitudinal pressure which tends to force it out of proper position.

My invention obviates the defects and relieves the detrimental results which I have enumerated, partly, in the above statement of some phases of the commercial art, and not only produces a flap which will adjust during the inflation of the tire and which is, in fact, a part of the tire, irrespective of the variation of pressure, but also one which will assist in balancing the tire.

With the use of the flap of my invention it is possible to omit the valve base from the tube for the following reasons: When a tire flap of the overlapping end type, wherein the ends are attached to the valve stem, is used, there is always considerable strain upon the stem exerted by the ends of the flap. This strain tends to tilt the valve stem out of its normal position and in so doing subjects the contiguous portion of the tube to strain which is sufficient in magnitude to tear the material of the tube if it were not for the valve base. However, in the flap of my invention the necessity for this base does not arise, since, because of the construction of the flap and its application to the tire, the valve stem is subjected to no strain, but on the other hand, occupies at all times its normal position. The elimination of this valve base, while not only cheapening the cost of manufacture of the tube, likewise makes it possible to more nearly and perfectly balance the tire.

In the drawings wherein one embodiment of my invention is disclosed:

Figure 1 is a sectional view of a wheel showing the relation of the flap to the tube and valve stem;

Figure 2 is a perspective view of the flap;

Figure 3 is a longitudinal sectional view of a portion of the flap;

Figure 4 is a transverse sectional view of the tire, showing the position of the flap, and Figure 5 is a fragmentary view of the flap showing the manner of attachment of the guides to the body of the flap.

The flap, which is made of any desired material and thickness to impart to it a semi-rigid condition, is of such form in transverse section that it may lie flat against the inner walls of the casing and against the rim and bridge the space between the beads of the casing, conforming to the desired contour. I have found that a flap, such as shown in the drawings, constructed of rubber 1, with a fabric insertion 2, which assists in the formation of the base of the flap and extends some distance into the beads or edges, for a purpose which will later appear, serves admirably. However, I do not intend to be limited to this construction of the flap as it is only one of the many which may be successfully employed.

The flap is non-continuous, actually, although in effect continuous, and has overlapping ends 3 and 4, which, sliding upon each other, longitudinally, permit the change of the effective diameter of the flap without destroying its effective continuity. On each end of the flap is located means for guiding the end in its sliding movement, so that the overlapping ends of the flap will be kept in alignment with the body portion during its expansion and contraction. The particular means which I illustrate in the drawing includes a keeper 5 which is carried by each end and embraces the adjacent portion of the flap. That is to say, each end carries a keeper and each end is inserted through the keeper on the opposite end. These keepers may be made integral with the flap or attached to it in any desirable way, such for instance, as vulcanizing or stitching. I have shown the keepers as stitched to the flap, since this method of attachment presents certain advantages. The stitching 6 which secures the keepers to the flap passes through the fabric element 2, which is incorporated in the structure of the flap, and thus secures the keepers in place without the liability of the attaching means for the keepers becoming inoperative.

I locate the opening 7 for the reception of the valve stem of the tube at a point between the ends of the flap and a sufficient distance from each end so that the ends will be free for movement extensive enough to accommodate the flap to any size of rim and tire. Furthermore, I so locate the valve receiving opening that the valve anchors the side of the flap remote from the ends to the rim, and thus permits the free adjustment of the ends one upon the other and the consequent successful expansion and contraction of the flap during the mounting and demounting on the one hand and during the inflation on the other. In other words, after the flap is placed in the tire casing, when, for instance, it is being used in connection with a clincher rim, the ends will be free to move one upon the other and the flap to expand during the stretching of the casing over the rim, and, because of the attachment of the flap to the rim at a point remote from the ends of the same, these ends will be free to move one upon the other to effect a contraction of the flap during the inflation of the tire. This contraction may, of course, be accomplished, to a certain extent, after the tire is put in place on the rim by jolting the rim-mounted tire. Whether however, the adjustment be accomplished by this jolting action or by the inflation of the tube it is successful to conform the flap to its ultimate position with respect to the tire casing and rim.

A small amount of pressure within the casing is sufficient to contract the flap to cause it to lie perfectly in alignment between the edges of the beads of the casing, and against the rim, and to evenly overlap the inner walls of the casing.

Furthermore, the flap once set in position becomes a permanent, substantially immovable part of the casing until it is desired to demount the tire, since there is no action incident to the use of the tire which will effectively destroy the sliding action of the ends with the consequent conforming of the flap to the rim.

Not only does the location of the valve stem opening remote from the ends of the flap as hereinbefore described permit the perfect adjustment of the flap during mounting, demounting and inflation, but it also assists in balancing the tire. It is well known that the location of the valve stem on one side of the tube necessarily destroys the balance of the tire owing to the weight of the stem. Attempts have been made to overcome this throwing out of balance of the wheel by joining the inner tube at a point opposite the valve stem and this is especially true of tubes for balloon tires. This, while somewhat counteracting the effect of the weight of the valve stem, does not totally accomplish the purpose, especially where the butt end flaps having the overlapping ends anchored to the valve stem are used, because the addition of the weight of the overlapping ends of the flaps naturally throws the tire out of balance.

However, with the construction of the tire flap of this invention the weight of the overlapping ends is opposite to that of the valve stem and counteracts the detrimental effect of the valve stem to a great degree. This feature is particularly advantageous in balloon tires, since the relatively low pressure used permits an unusual flexing of the tire casings and a consequent relative movement of the parts.

The present invention produces a three-point balance within the tire irrespective of the size of the tire due to the fact that the flap is anchored to the rim by the valve stem 8 of the tube 9 and the ends of the flap are free to adjust to tires of any size within, of course, certain limits.

Furthermore, it will be seen that by attaching the flap at a fixed point to the rim, that is to say, at the position of the valve in the tube, the two ends of the flap are free to slide one upon the other and to adjust themselves within the tube. This adjustment, it will readily be realized, is only of a portion of the flap and may take place by the movement of either or both of the ends of the flap. For instance, as in placing the casing upon the rim the one side of the flap, that is to say, from the point of attachment of the valve stem to the end of the side flap, lies flat against the rim, the entire slack or looseness will lie in the other side of the flap, that is to say, from the valve stem to the opposite end. In this event, the entire movement of adjustment will be by one end upon the other, the latter end remaining stationary, but should both sides of the rim lie loosely within the casing, after the latter is placed upon the rim, each side will move upon the other and the adjustment will be accomplished as in the case of only one side moving. Thus it will be seen that irrespective of the position of the flap the adjustment will be perfect, and after adjustment, a three-point balance will be established within the tire.

I claim:

1. In a tire assembly the combination with a rim, a tube and a casing having spaced edges, of a tire flap arranged between the tube and the rim to bridge the space between the edges of the casing, said flap having overlapping ends slidable upon each other and having means for guiding said ends in their relative sliding movement, said flap having a valve stem receiving opening substantially midway between the ends, the valve stem of the tube acting to anchor the flap to the rim at a point substantially opposite the overlapping ends, whereby the weight of the valve stem and its associated parts will be opposed to the weight of the overlapping ends and both ends of the flap will be free to move during inflation of the tube.

2. A tire flap having overlapping ends relatively movable in line with the flap, having means for guiding said ends in their relatively sliding movement and having a valve stem receiving opening located substantially midway between the ends of the flap, 3. A tire flap having overlapping ends relatively movable in line with the flap, having means for guiding said ends in their relative sliding movement and having a valve stem receiving opening so located with respect to the overlapping ends that, in use, the weight of the valve stem and its associated parts will be opposed to the weight of the overlapping ends of the flap.

In testimony whereof, I have signed my name to this specification this 18th day of June, 1924.

WILLIAM BEANEY.